United States Patent [19]
Hosoi et al.

[11] Patent Number: 5,589,934
[45] Date of Patent: Dec. 31, 1996

[54] LIGHT MEASURING APPARATUS CAPABLE OF MEASURING AMBIENT LIGHT AND FLASH LIGHT

[75] Inventors: Norihisa Hosoi, Toyokawa; Susumu Shirai, Toyohashi; Kenichiro Hibi, Toyokawa; Yoshihiro Okui, Daitoh; Takehiro Katoh, Nara; Yoshihiko Azuma, Kawasaki, all of Japan

[73] Assignee: Minolta Co., Ltd., Osaka, Japan

[21] Appl. No.: 368,876

[22] Filed: Jan. 5, 1995

[30] Foreign Application Priority Data

Jan. 17, 1994 [JP] Japan .................. 6-002977

[51] Int. Cl.⁶ .......................... G01J 1/46; G03B 15/05
[52] U.S. Cl. .................. 356/218; 356/215; 396/157; 396/201
[58] Field of Search ...................... 356/213, 215, 356/218, 222, 223, 226, 229, 230; 354/415, 475, 465

[56] References Cited

U.S. PATENT DOCUMENTS

| | | | |
|---|---|---|---|
| 4,262,997 | 4/1981 | Yuasa | 356/226 |
| 4,291,979 | 9/1981 | Yuasa et al. | 354/415 |
| 4,637,721 | 1/1987 | Naruse et al. | 356/215 |
| 4,655,576 | 4/1987 | Yuasa et al. | 354/415 |
| 4,914,468 | 4/1990 | Naruse et al. | 356/215 |
| 4,994,845 | 2/1991 | Narusa et al. | 354/415 |

Primary Examiner—Hoa Q. Pham
Attorney, Agent, or Firm—Price, Gess & Ubell

[57] ABSTRACT

A light measuring apparatus capable of measuring ambient light, flash light from a flash source directly connected to the light measuring apparatus and flash light from a flash source that is remote. A photoelectric sensor can convert the light into electrical signals when an operator starts a light measurement cycle. A flash light emission signal can be generated to a flash source. The computer circuit can process the light signals to determine the specific mode of operation of the light measuring process, and based upon that particular mode of operation to appropriately calculate measurement values.

7 Claims, 8 Drawing Sheets

LIGHT MEASURING APPARATUS CAPABLE OF MEASURING AMBIENT LIGHT AND FLASH LIGHT

BACKGROUND OF THE INVENTION

1. Field of the Invention

The present invention relates to a light measuring apparatus, and more particularly, to a light measuring apparatus capable of measuring ambient light and flash light.

2. Description of the Prior Art

Various types of light measuring apparatus capable of measuring ambient light and flash light (exposure meters used in combination with a camera for photo-taking purposes, for example) have been long proposed. An exposure meter published in U.S. Pat. No. 4,262,997, for example, has three measurement modes: an ambient light mode in which ambient light is measured: a cord-connected measurement mode in which, in response to a manual operation, a light emission starting signal is sent to a flash unit connected to the exposure meter via a cord and light measurement begins at the same time; and a non-cord measurement mode in which light measurement begins when the commencement of flash light emission is detected.

However, with the above conventional exposure meter, it is necessary for the user to manually set the measurement mode in advance depending on the type of light to be measured (ambient light or flash light) and on the measurement method desired (cord-connected measurement or non-cord measurement). Therefore, the measurement mode has to be set or confirmed for every measurement session, which slows down the commencement of light measurement. Moreover, every time the user wishes to perform measurement using a mode different from the previous session, he has to switch the mode manually. If he has forgotten this setting or switching of the measurement mode, measurement results may not be obtained or measurement errors in which unintended measurement values are displayed may occur, as a result of which the user is forced to perform light measurement once again.

The present invention was made in view of said problems with the conventional product. The object of the present invention is to provide a light measuring apparatus for which it is not necessary to manually set the measurement mode in advance depending on the type of light to be measured or on the measurement method desired and in which measurement errors caused by mode setting do not occur.

SUMMARY OF THE INVENTION

Using the light measuring apparatus of the present invention, an ambient light measurement mode in which measurement is performed without the emission of flash light, a cord-connected measurement mode in which the flash unit is connected to the apparatus by means of a cord and in which light measurement begins at the same time that a flash light emission signal is sent, and a non-cord measurement mode in which measurement begins in response to the detection of flash light emission without connecting the flash unit to the apparatus, are possible. The apparatus is capable of automatically determining the mode in which the measurement took place based on the output from a photoelectric sensor.

Further, it is capable of calculating the measurement value corresponding to the mode in which the measurement was performed after automatically determining the mode in which the measurement took place.

Other objects and advantages of the present invention will become apparent from the detailed description to follow taken in conjunction with the appended claims.

BRIEF DESCRIPTION OF THE DRAWINGS

FIGS. 4(a–c) are a timing chart showing the operational timing of the integration circuits of the exposure meter in one embodiment of the present invention.

DETAILED DESCRIPTION OF THE PREFERRED EMBODIMENTS

An embodiment of the present invention is described below with reference to the drawings. The exposure meter in this embodiment is capable of ambient light measurement in which the ambient light is measured, cord-connected measurement in which the exposure meter and the flash unit are connected by means of a cord to measure the flash light and a light emission starting signal is sent to the flash unit in response to the manual operation while light measurement begins at the same time, and non-cord measurement in which the exposure meter and the flash unit are not connected by means of a cord and light measurement begins upon the detection of light emission by the flash unit.

Figure 1:
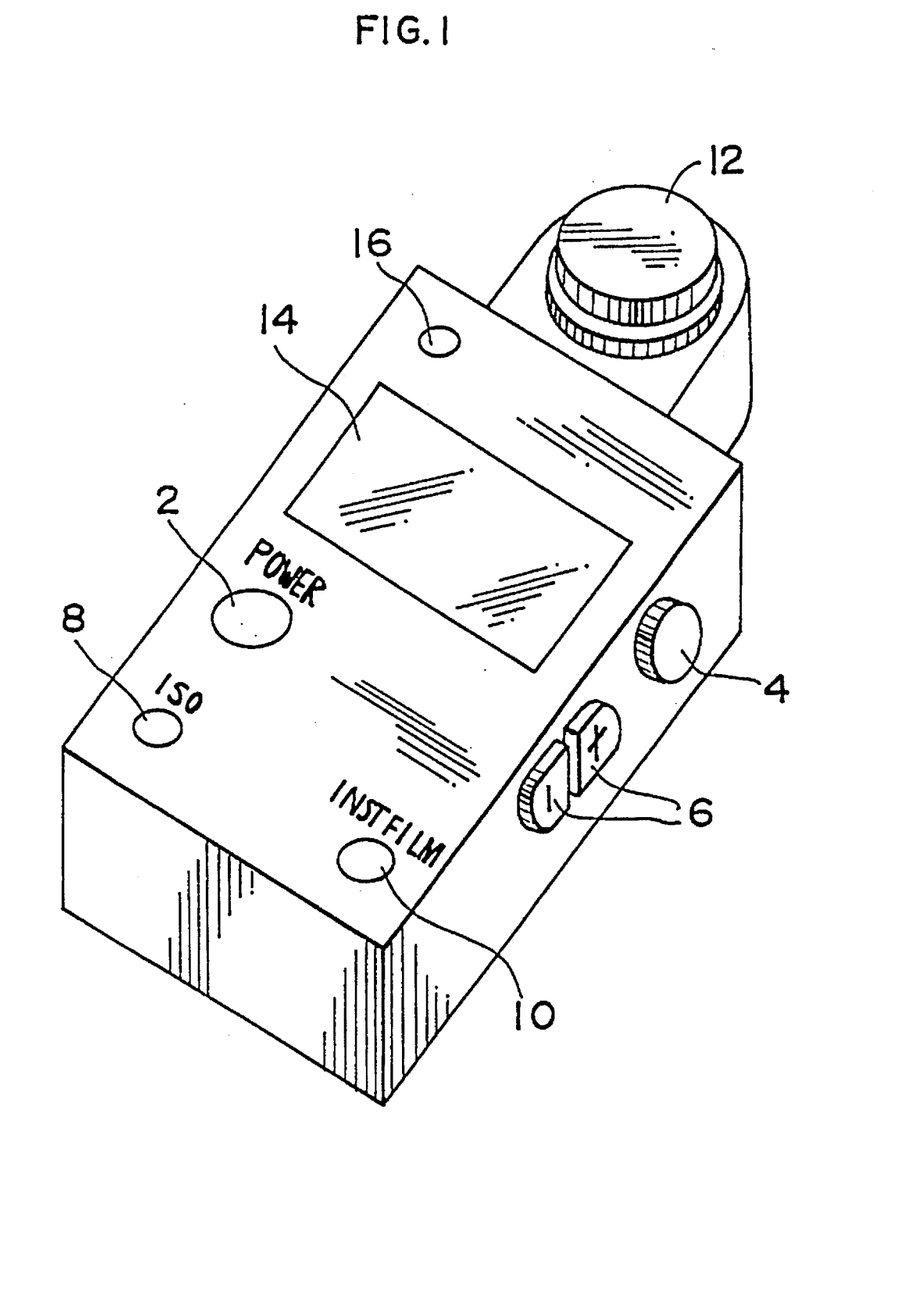
FIG. 1 shows the appearance of the exposure meter in one embodiment of the present invention.

FIGS. 1 shows the appearance of the exposure meter of the present invention. In the drawing, 2 is a power button to turn ON and OFF the power to the apparatus and 4 is a measurement button to start light measurement. 6 is an up-down key, by the operation of which the exposure time (Tvs) is set. This up-down key 6 can also set the film sensitivity (Sv) when operated while ISO key 8 is pressed. Further, it can set the film sensitivity (Sv') of instant film, etc. other than the set film sensitivity (Sv) when operated while instant key 10 is pressed.

12 is a photoreceptor ball, inside of which is a photoelectric converter element 40 (described below) used for light measurement. 14 is a display unit to display various data such as light measurement values. 16 is an element located separately from said light measurement photoelectric converter element 40 and detects the brightness of the ambient light when said switches are operated. When the ambient brightness is below a prescribed level, a back light located inside display unit 14 is lit for a certain duration. When the switches are operated while the back light is lit, the period over which the back light is lit is extended for a prescribed time starting from the point in time when the switches were operated. Incidentally, the function of photoelectric converter element 16 may be performed by light measurement photoelectric converter element 40 inside the photoreceptor ball.

Figure 2:
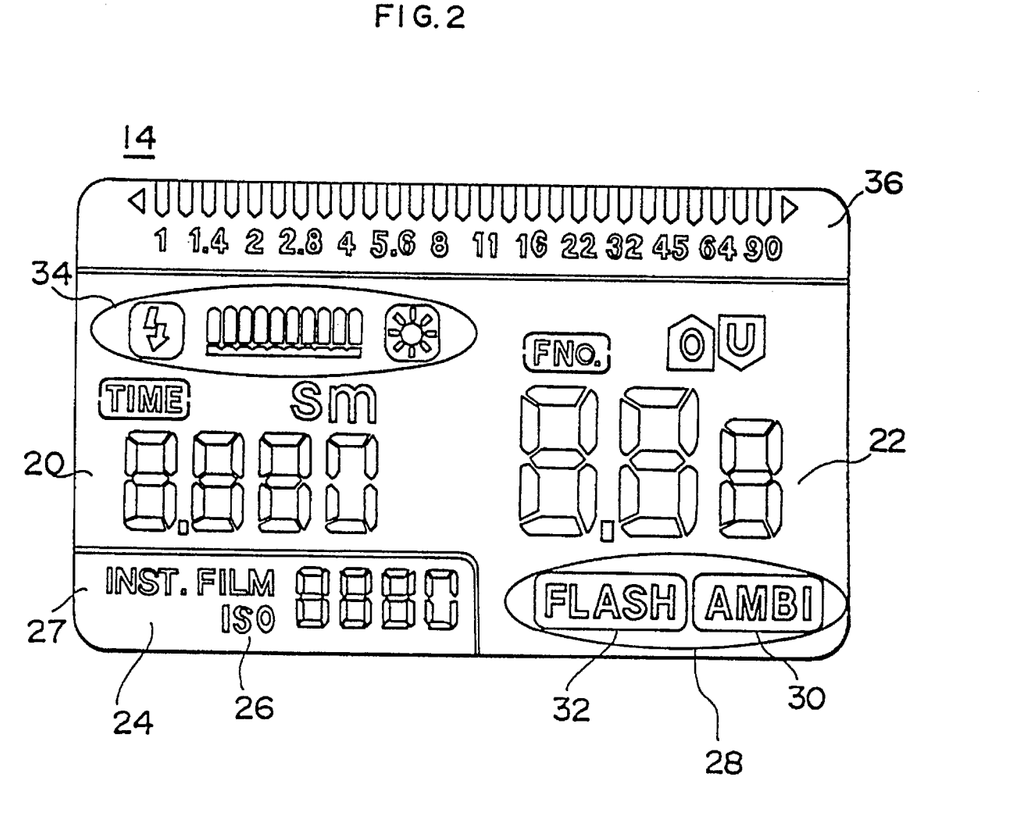
FIG. 2 shows the content of the display in the display unit of the exposure meter in one embodiment of the present invention.

FIG. 2 shows the content of the display of said display unit 14. 20 and 22 indicate the exposure time and aperture value, respectively. 24 is a film sensitivity display area. In the standard state, the set film sensitivity is displayed together with ISO mark 26. Where said instant key 10 is pressed, the preset film sensitivity of instant film is displayed together with ISO mark 26 and INST. FILM mark 27. This display of instant film sensitivity is shown only while instant key 10 is pressed, and when key 10 is released, the display returns to the original display. Light measurement using the sensitivity of instant film is described in detail below.

28 is a type of light display area in which the type of light measured is displayed. When the light measured is ambient light only, AMBI mark 30 is lit, and when it also includes flash light, FLASH mark 32 is lit. 34 is an analysis display area where the ratio of flash light to ambient light in the light measured is displayed. In this embodiment, one dot represents 10%, and by consecutively lighting these dots from the left, the flash light ratio is indicated.

36 is an analog display area in which an F-number calculated by photometric calculation is displayed in an analog fashion together with the digital display in aperture value display area 22. This analog display area 36 not only displays the F-number in an analog fashion; when light measurement is performed using multiple points of the photo object, for example, it is also capable of consecutively displaying the measurement values at those points using dots. However, since this light measurement and display using multiple points are already publicly known, a more detailed description will not be provided.

With the exposure meter of this embodiment, in addition to the basic photometric calculation in which the film sensitivity and exposure time are set in advance and a corresponding F-number is calculated as a measurement value, various light measurement values as disclosed in Patent Gazette S64-2927, for example, may be output. However, since these photometric calculations are already publicly known, and the constructions in which they are embodied are not directly related to the features of the present invention, a detailed description will not be provided.

Figure 3:
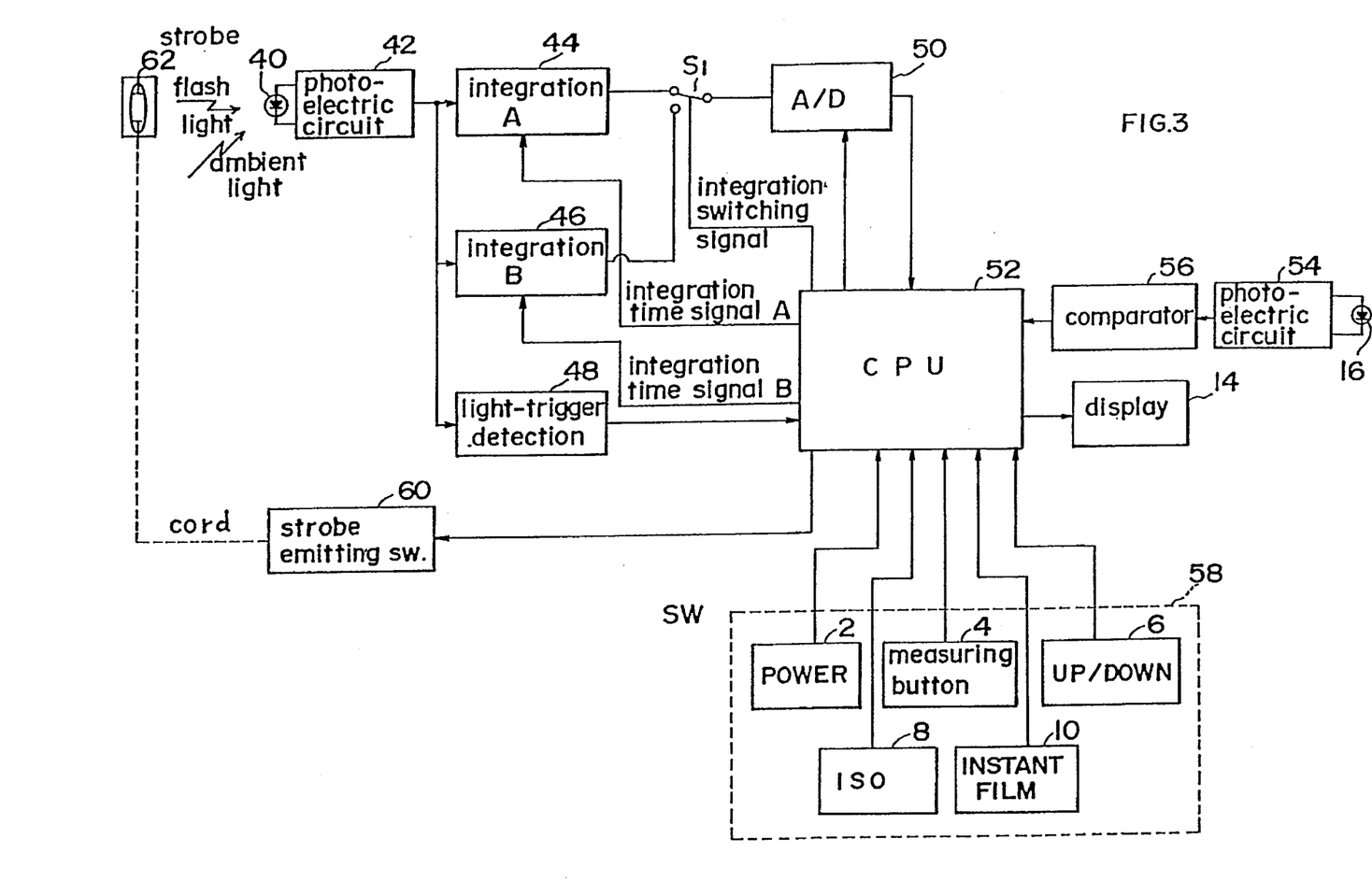
FIG. 3 is a block diagram showing the construction of the circuitry of the exposure meter in one embodiment of the present invention.

FIG. 3 is a block diagram showing the construction of the circuitry for the exposure meter of this invention. In the drawing, 40 is a photoelectric converter element located inside said photoreceptor ball 12 and used for light measurement, which converts the received light to be measured into an electric signal. The output signal from photoelectric converter element 40 is output as electric current, the level of which corresponds to the intensity of the light being measured, via photoelectric conversion circuit 42.

44 and 46 are integration circuits for accumulating the electric current output frown photoelectric conversion circuit 42. They are termed integration circuit A and integration circuit B, respectively. The operation of these two integration circuits is regulated by integration time signals A and B output from CPU52, respectively, and each circuit carries out integration at prescribed times and for prescribed durations. The integration outputs accumulated by integration circuits A or B are converted into digital values by A/D conversion circuit 50, after which they are output to CPU52 as photometric outputs. S1 is a switch to select whether the output from integration circuit A or the output from integration circuit B is to be input to CPU52, and is regulated by an integration circuit switching signal output from CPU52. The timing of the operation of the two integration circuits and the switching of the output are described in detail below.

48 is a light trigger detection circuit to detect the commencement of light emission from the flash unit in non-cord measurement mode. This light trigger detection circuit 48 detects the commencement of flash light emission by detecting a sudden surge in the level of electric current output from photoelectric conversion circuit 42. When the commencement of flash light emission is detected, light trigger detection circuit 48 outputs an interrupt signal to CPU52.

52 is a CPU to regulate the operation of the entire apparatus. It also performs photometric calculation based on the photometric output generated by photoelectric converter element 40 and input via the photoelectric conversion circuit, an integration circuit and A/D conversion circuit. 54 is a circuit to output the output signal from said photoelectric converter element 16 for detecting the ambient brightness as an electric signal corresponding to the ambient brightness. This output is compared with a prescribed value by comparison circuit 56, and CPU52 turns ON or OFF the built-in back light (not shown in the drawings) inside display unit 14 based on the resulting comparison data.

58 is a group of switches comprising said power button 2, measurement button 4, up-down key 6, etc., and is used for various types of operation and settings. 60 is a flash light emission switch. It outputs a flash light emission signal in response to the turning ON of measurement button 4. In the case of cord-connected measurement mode in which flash unit 62 and the exposure meter are connected using a cord, flash unit 62 is caused to emit light by means of this light emission signal.

Figure 4A:
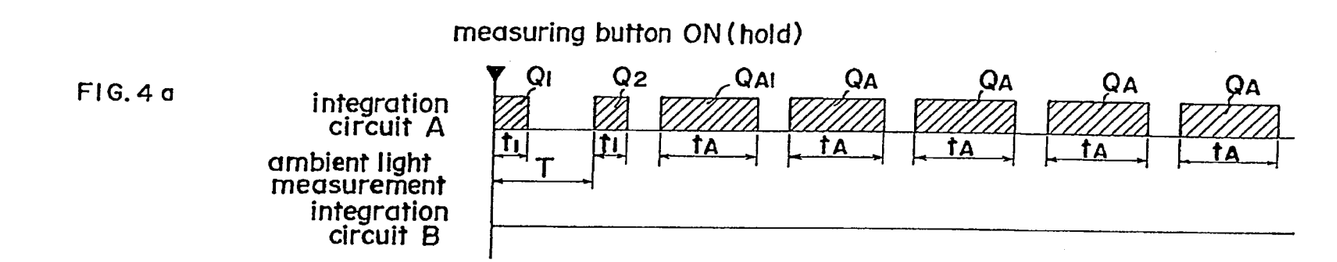
Figure 4B:
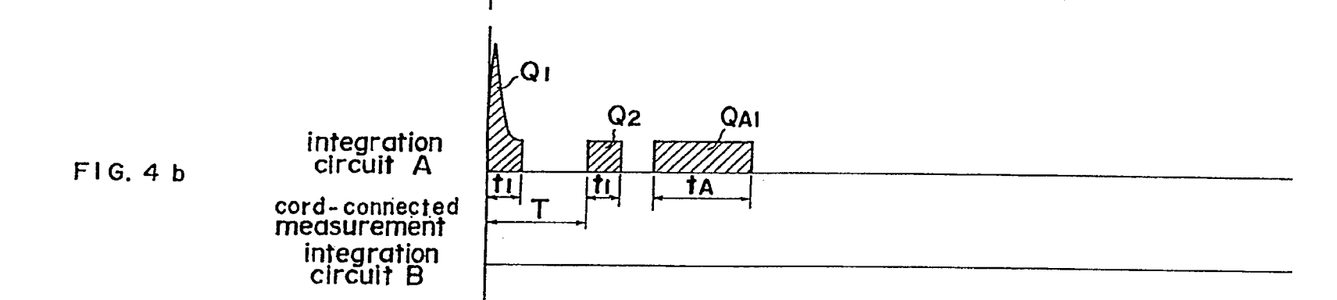
Figure 4C:
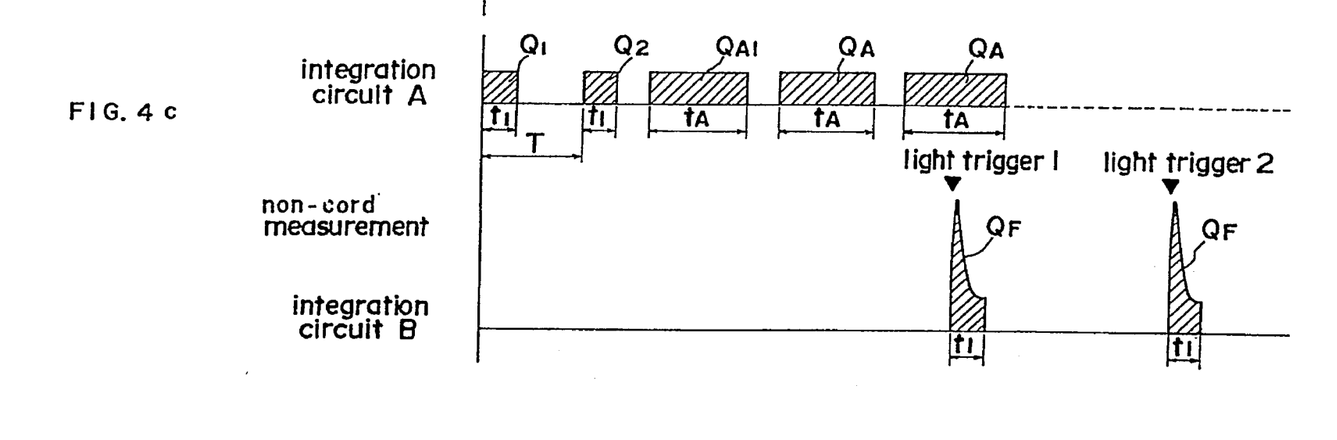

FIG. 4 is a time chart showing the timing of the operation of integration circuits A and B in each measurement mode. The operation of the exposure meter in each measurement mode is now explained with reference to the block diagram of FIG. 3 and the timing chart of FIG. 4.

In the exposure meter of the present embodiment, integration is carried out for time t1 by integration circuit A immediately after measurement button 4 is turned ON, and integration is then performed again for time t1 when prescribed time T has elapsed after measurement button 4 is turned ON. Here the integration output accumulated in the first integration is deemed Q1 and the integration output accumulated in the second integration is deemed Q2. Incidentally, integration time t1 is determined depending on the exposure time (Tvs) set by the user, and is deemed to be equal to the set exposure time in this embodiment.

After these two integration sessions have taken place, another integration is performed for time tA in order to measure the ambient light. The integration output, obtained at this time is deemed QA1. Incidentally, this integration time tA is predetermined regardless of the set exposure time (Tvs).

When measurement button 4 is turned ON, a flash light emission signal is output from CPU52 via flash light emission switch 60. Simultaneously, integration time signal A is output from CPU52 to integration circuit A, whereby the above described integration for time t1 takes place twice, followed by integration for time tA. Each integration output obtained in these integration sessions is serially input to CPU52 as a photometric output after being converted into a digital value by A/D conversion circuit 50. CPU52 performs photometric calculation suitable for each measurement method based on the photometric output input to it.

In the case of ambient light measurement, because the exposure meter and flash unit 62 are not connected with a cord, even though a light emission signal is output in response to the turning ON of measurement button 4, no flash light is emitted. Therefore, no flash light is included in either of the above described two integration sessions performed for time t1, and the two outputs Q1 and Q2 obtained in the two sessions will be equal (Q1=Q2). CPU52 compares these two outputs Q1 and Q2 and determines that the ambient light was measured by detecting that Q1 equals Q2. When it is determined that the measurement was performed for the ambient light, CPU52 carries out photometric calculation based on integration output QA1 and outputs the result of the photometric calculation to display unit 14 as a measurement value obtained during ambient light measurement.

In the case of cord-connected measurement, because the exposure meter and flash unit 62 are connected with a cord, flash light is emitted in response to the turning ON of measurement button 4. Therefore, among the two integration sessions for time t1 described above, the flash light component is added to output Q1 obtained in the first integration. Because of this, in cord-connected measurement, the two outputs Q1 and Q2 will have a relationship in which Q1 is larger than Q2 (Q1>Q2). CPU52 compares these two outputs Q1 and Q2 and, by detecting that Q1 is larger than Q2, determines that the measurement method used was cord-connected measurement. When it is determined that the measurement method was cord-connected measurement, CPU52 performs photometric calculation based on integration output Q1 including the flash light, and outputs the result of the photometric calculation to display unit 14 as a measurement value obtained during cord-connected measurement.

The case of non-cord measurement is explained below. In the case of non-cord measurement, because flash light measurement begins as soon as the commencement of flash light emission is detected by light trigger detection circuit 48, the same operation as said ambient light measurement takes place until the flash light is emitted. When the commencement of flash light emission is detected by light trigger detection circuit 48 (light trigger 1 in FIG. 4), CPU52 immediately outputs integration time signal B in order to cause integration circuit B to start integration. Integration is then performed by integration circuit B for time t1. The integration output obtained in this integration is deemed QF. When the integration is finished, switching switch S1 is connected to integration circuit B by an integration circuit switching signal and output QF is input to CPU52 after being converted into a digital value by A/D conversion circuit 50. CPU52 then performs photometric calculation based on integration output QF and outputs the result of the photometric calculation to display unit 14 as a measurement value obtained during non-cord measurement.

The explanation provided above describes the order of operation for the exposure meter in each measurement method. Incidentally, while said integration time t1 is made equal to the set exposure time in this embodiment, this is only one example, and the present invention is not limited to this. In addition, in this embodiment, because the measurement precision may drop where the exposure time set by the user is smaller than 1/1000 second, integration time t1 is automatically set to 1/1000 second (equivalent to Apex value 10).

Figure 5:
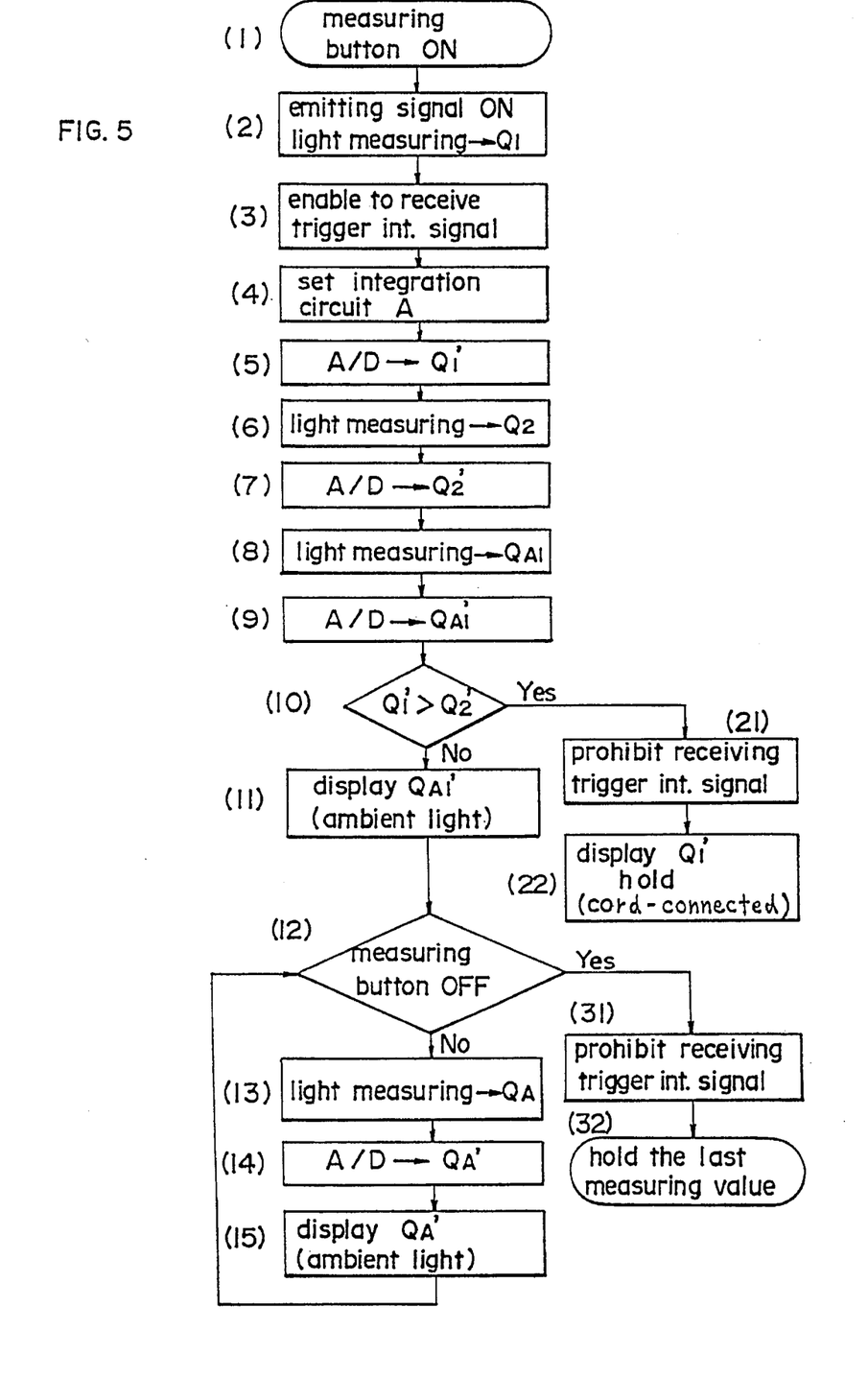
FIG. 5 is a flow chart showing the order of operation pertaining to the exposure meter in a first embodiment of the present invention.
Figure 6:
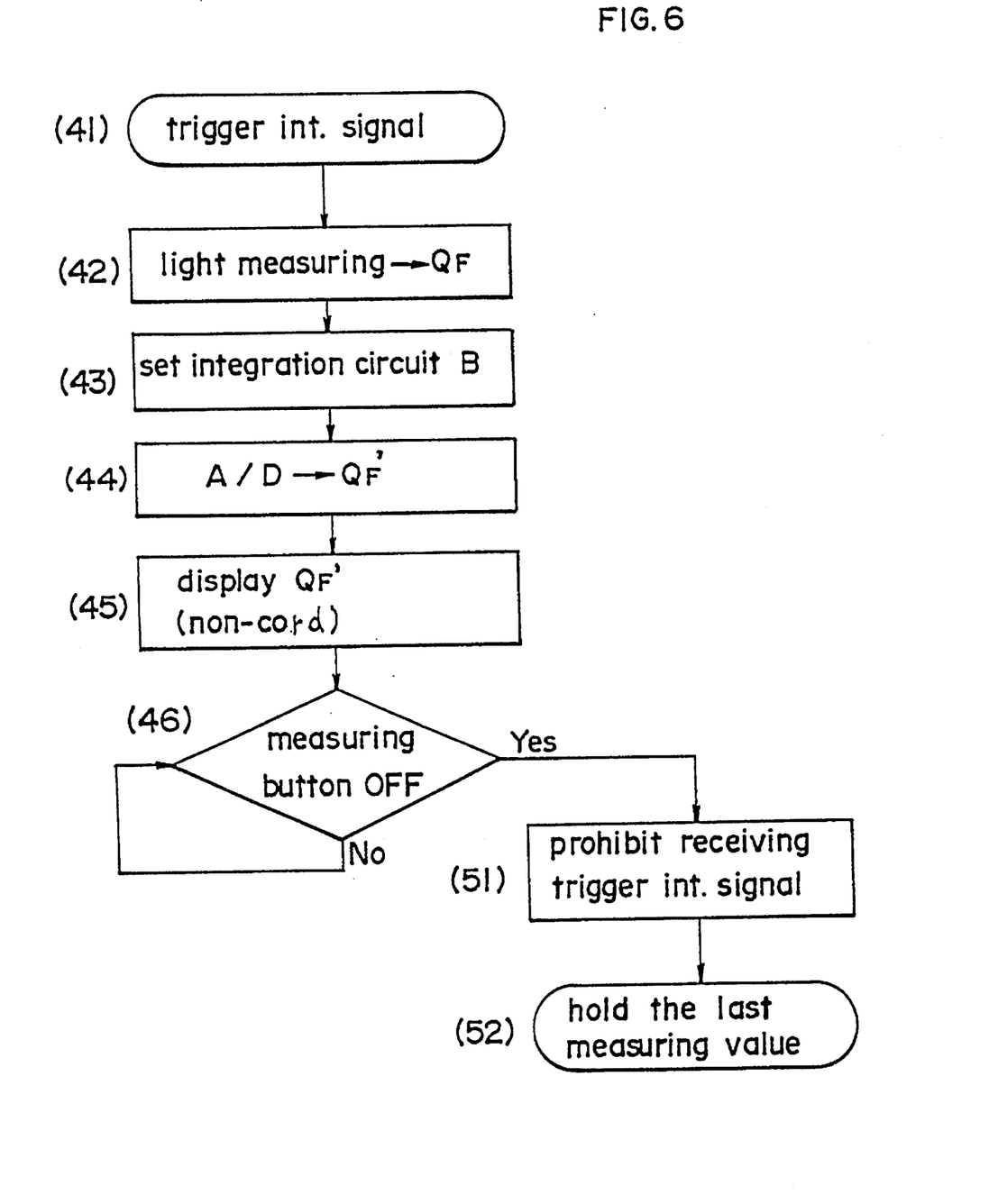
FIG. 6 is a flow chart showing the order of operation pertaining to the exposure meter in the first embodiment of the present invention.

FIGS. 5 and 6 are flow charts showing the operational sequence of the exposure meter. The operation of the exposure meter of this embodiment is explained below in more detail with reference to the flow charts. In the exposure meter of this embodiment, when power is turned ON by power button 2, a stand-by state is entered in which the exposure meter waits for the commencement of light measurement triggered by measurement button 4. When measurement button 4 is turned ON, the operational routine shown in FIGS. 5 and 6 begins.

When measurement button 4 is turned ON (1), a flash light emission signal is output from CPU52 in response via flash light emission switch 60. When this happens, if the mode is cord-connected measurement mode in which the exposure meter and the flash unit are connected by means of a cord, flash light is emitted. Then, in response to the turning ON of measurement button 4, light measurement begins, whereby integration is carried out by integration circuit A for time t1 (2). The integration output accumulated in this time t1 is deemed Q1. When the integration is finished, CPU52 is enabled to receive light trigger interrupt signals from light trigger detection circuit 48 (3). Then, by means of an integration circuit switching signal from CPU52, switching switch S1 is connected to integration circuit A (4). After integration output Q1 is converted into digital value Q1' by A/D conversion circuit 50 (5), it is input to CPU52. This photometric output Q1' is temporarily saved in a built-in memory (not shown in the drawings) of CPU52.

Then when prescribed time T elapses after the commencement of light measurement, integration takes place once again for time t1 (6). The resulting integration output is deemed Q2. This integration output Q2 is converted into digital value Q2' by A/D conversion circuit 50 (7) and is temporarily saved in CPU52's built-in memory in the same way as Q1'. These two photometric outputs Q1' and Q2' saved in CPU52's memory are later compared with each other and are used for determining whether the mode is ambient light measurement mode or cord-connected measurement mode.

Further, integration is performed for time tA in order to perform ambient light measurement (8). The resulting integration output obtained is deemed QA1, and after being converted into digital value QA1' is saved in CPU52's memory in the same way as described above (9).

Next, photometric output Q1' obtained in the first integration and photometric output Q2' obtained in the second integration are compared (10). In the case of ambient light measurement, flash light emission does not take place either during the first or second integration. Therefore, photometric outputs Q1' and Q2' are equal. On the other hand, where the mode is cord-connected measurement, because flash light is emitted in response to the output of a flash light emission signal in step (2), photometric output Q1' becomes larger than Q2' (Q1'>Q2'). Therefore, where the result of comparison of the photometric outputs is Q1'>Q2' ('YES' in step (10)), after the reception of light trigger interrupt signals is prohibited (21), photometric calculation using photometric output Q1' which includes flash light is performed, the result of which is then displayed in display unit 14 as a measurement value obtained during cord-connected measurement (22). This display of the measurement value is maintained until measurement button 4 is turned OFF and turned ON again in order to enter the next photometric operation.

On the other hand, where the result of comparison of the photometric outputs was Q1'=Q2' ('NO' in step (10)), photometric calculation is performed using photometric output QA1' obtained when integration was performed for time tA in order to perform ambient light measurement, the result of which is displayed in display unit 14 as a measurement value obtained during ambient light measurement (11). Incidentally, while photometric calculation in the ambient light measurement mode is performed based on photometric output QA1' in this embodiment, the integration for time tA may be omitted by having the photometric calculation performed based on Q1' or Q2'. Where a value equivalent to QA1' is calculated from Q1' or Q2', the conversion can be made using the simple formula Q1' (or Q2')×(tA/t1). In this case, because the integration for time tA may be omitted, the control of the apparatus may be simplified and the time needed for light measurement may be reduced.

In this embodiment, it is determined that if Q1' is larger than Q2' in step (10), the mode is cord-connected measurement mode, and that in all other cases, the mode is ambient light measurement mode. However, using this method of determination, Q1' can be larger than Q2' even if the mode is ambient light measurement mode, and the determination that the mode is cord-connected measurement mode can be made because of a subtle change in the measured light between the first and second integration sessions, or because of a quantizing error arising in the A/D conversion circuit. Therefore, instead of determining whether Q1' is larger than Q2' in step (10), the difference between Q1' and Q2' may be calculated and determination may be made regarding whether or not this difference is larger than a prescribed level. Using this method of determination, an erroneous determination that the mode is cord-connected measurement may be prevented even if the measured light subtly changes or a quantizing error occurs in the A/D conversion circuit in the ambient light measurement mode.

After photometric calculation and display based on photometric output QA1' are carried out in step (11) in ambient light measurement mode, it is determined in step (12) whether or not measurement button 4 is ON. If measurement button 4 is still ON, integration takes place again for time tA and integration output QA is obtained (13). After this integration output QA is converted into digital value QA' (14), photometric calculation and display based on photometric output QA' are carried out (15). After this, the operation from steps (13) through (15) is repeated until measurement button 4 is turned OFF. Because of this, as long as measurement button 4 is ON, the measurement value is renewed at prescribed intervals, whereby the latest measurement value is displayed at all times.

When measurement button 4 is turned OFF, 'YES' is returned in step (12). After the reception of light trigger interrupt signals is prohibited (31), the display is put on hold while displaying the last measurement value for the last light measurement. This display is maintained until measurement button 4 is turned ON again, as in the case of cord-connected measurement.

Although in this embodiment, the comparison in step (10) to determine whether the mode is ambient light measurement mode or cord-connected measurement mode is performed after the integration in steps (8) and (9) in order to perform ambient light measurement, this comparison may take place when photometric outputs Q1' and Q2' are obtained (after step (7)).

Next, in the case of non-cord measurement, when the commencement of flash light emission is detected by light trigger detection circuit 48 after CPU52 is enabled to receive light trigger interrupt signals in step (3), step (41) in FIG. 6 is immediately jumped to as an interrupt operation. When the commencement of flash light emission is detected, integration is immediately performed by integration circuit B for time t1 (42). The integration output accumulated by this integration is deemed QF. Then, switching switch S1 is connected to integration circuit B (43) by means of an integration circuit switching signal from CPU52. After integration output QF is converted into digital value QF' by A/D conversion circuit 50 (44), it is input to CPU52. CPU52 performs photometric calculation using photometric output QF', the result of which is displayed in display unit 14 as a measurement value obtained during non-cord measurement (45).

After the photometric calculation and display based on photometric output QF' in non-cord measurement take place in step (45), it is determined in step (46) whether or not measurement button 4 is ON. If measurement button 4 is still ON, said display is maintained while CPU52 is kept enabled to receive light trigger interrupt signals. If flash light is emitted again during this time (light trigger 2 in FIG. 4), a light trigger interrupt signal is output and light measurement of non-cord measurement begins again starting from step (41). On the other hand, if measurement button 4 is turned OFF, after the reception of light trigger interrupt signals is prohibited (51), the display is put on hold while displaying the last measurement value for the last light measurement (52). This display also is maintained until measurement button 4 is turned ON again.

In non-cord measurement mode, where the set exposure time (Tvs) is shorter than 1/1000 second, not only is integration time t1 automatically changed to 1/1000 second, but the set exposure time (Tvs) itself is also changed to 1/1000 second and an aperture value corresponding to this 1/1000 second exposure time is calculated. This holds true for cord-connected measurement mode as well.

The above description shows the operational sequence of the exposure meter of this embodiment.

The operational sequence of the exposure meter of another embodiment (a second embodiment) of this invention is explained below with reference to the flow charts in FIGS. 7 and 8. This second embodiment differs from the first embodiment only in its operational sequence: the appearance and circuitry of the apparatus, etc. are identical. In the second embodiment, integration begins when flash light emission is detected by light trigger detection circuit 48 in cord-connected measurement mode in the same way as in non-cord measurement mode.

First, as in the case of the first embodiment, when the power to the exposure meter is turned ON by means of power button 2 in the second embodiment, the exposure meter enters a stand-by condition in which it awaits the commencement of light measurement by means of measurement button 4. When measurement button 4 is turned ON, the operational sequence shown in FIGS. 7 and 8 begins.

In response to the turning ON of measurement button 4 (101), CPU52 is enabled to receive flash light detection signals (interrupt signals) from light trigger detection circuit 48 (102). By enabling CPU52 to receive interrupt signals in this step (102), regardless whether the mode is cord-connected measurement mode or non-cord measurement mode, if flash light is emitted in the ensuing steps, the interrupt sequence starting with step (131) in FIG. 8 is immediately jumped to. In step (103), in response to the turning ON of measurement button 4, CPU52 outputs a flash light emission signal via flash light emission switch 60. When this happens, if the mode is cord-connected measurement mode, flash light is emitted from flash unit 62 and the routine jumps to the interrupt sequence starting with step (131). The operation beginning with step (131) is described below.

On the other hand, in the case of ambient light measurement or non-cord measurement, the exposure meter advances to step (104) and integration is performed by integration circuit A for time tA in order to perform measurement of ambient light. The resulting integration output is deemed QA1. Then, switching switch S1 is connected to integration circuit A by means of an integration circuit switching signal from CPU52 (105). After integration output QA1 is converted into digital value QA1' by A/D conversion circuit 50 (106), it is input to CPU52. CPU52 performs photometric calculation using this photometric output QA1', the result of which is displayed in display unit 14 as a measurement value obtained during ambient light measurement (107).

After photometric calculation and display based on photometric output QA1' are carried out in step (107) in ambient light measurement mode, it is determined in step (108) whether or not measurement button 4 is ON. If measurement button 4 is still ON, integration takes place again for time tA and integration output QA is obtained (109). After this integration output QA is converted into digital value QA' (110), photometric calculation and display based on this photometric output QA' takes place (111). After this until measurement button 4 is turned OFF, the operation from steps (109) through (111) is repeated. Consequently, as long as measurement button 4 is ON, the measurement value is renewed at prescribed intervals, whereby the latest measurement value is displayed at all times.

When measurement button 4 is turned OFF, 'YES' is returned in step (108). After the reception of light trigger interrupt signals is prohibited (121), the display is put on hold while displaying the last measurement value for the last light measurement. This display is maintained until measurement button 4 is turned ON again in order to enter another photometric operation.

In the case of ambient light measurement, light measurement is performed in accordance with the sequence from steps (101) through (122) described above. On the other hand, in the case of non-cord measurement, the same operation as the ambient light measurement described above is performed until flash light is emitted. When flash light is emitted, the routine jumps to the interrupt sequence starting with step (131) in response to an interrupt signal immediately output by light trigger detection circuit 48. The interrupt sequence from step (131) onward is explained below.

When flash light is emitted and the flash light is detected by light trigger detection circuit 48 in cord-connected measurement mode or non-cord measurement mode, integration is immediately carried out by integration circuit B for time t1 (132). The resulting integration output is deemed QF. Then, based on a integration circuit switching signal from CPU52, switching switch S1 is connected to integration circuit B (133). After integration output QF is converted into digital value QF' by A/D conversion circuit 50 (134), it is input to CPU52.

In step (135), in order to determine whether the flash light emission detected by light trigger detection circuit 48 is for cord-connected measurement or non-cord measurement, it is determined whether a light trigger interrupt signal was output within a prescribed time after measurement button 4 was turned ON. In the case of cord-connected measurement, because flash light is emitted when a flash light emission signal is output in step (103). the interval between when measurement button 4 is turned ON and when a light trigger interrupt signal is output is very short. (The user feels as if the flash light were emitted simultaneously with the turning ON of measurement button 4). On the other hand, in the case of non-cord measurement, the interval between the turning ON of measurement button 4 and the output of a light trigger interrupt signal is relatively long in comparison with cord-connected measurement. Therefore, it is possible to determine whether the mode is cord-connected measurement mode or non-cord measurement mode by determining whether a light trigger interrupt signal was output within a prescribed time after measurement button 4 was turned ON. The prescribed time used for the above comparison is given in advance considering the time lag between the flash light emission from flash unit 62 after the turning ON of measurement button 4 and the detection of this light emission and the output of an interrupt signal by light trigger detection circuit 48, etc.

Where a light trigger interrupt signal is output within a prescribed period of time ('YES' in step (135))—namely, where the mode is cord-connected measurement mode—the reception of interrupt signals is prohibited (151) and photometric calculation and display based on photometric output QF' are then performed (152). This display is maintained until measurement button 4 is turned OFF and turned ON again in order to enter another photometric operation.

On the other hand, where a light trigger interrupt signal is not output within a prescribed period of time ('NO' in step (135))—namely, where the mode is non-cord measurement mode—photometric calculation using photometric output QF' is performed, the result of which is displayed in display unit 14 as a measurement value obtained in non-cord measurement mode.

After photometric calculation and display based on photometric output QF' in non-cord measurement mode are performed in step (136), it is determined in step (137) whether or not measurement button 4 is ON. If measurement button 4 is still ON, said display is maintained with CPU52 still enabled to receive light trigger interrupt signals. If flash light is emitted again during this time, a light trigger interrupt signal is output and photometric operation in non-cord measurement mode begins again from step (131). On the other hand, if measurement button 4 is turned OFF, the reception of light trigger interrupt signals is prohibited (141) and the display is put on hold while displaying the last measurement value for the last light measurement (142). This display is also maintained until measurement button 4 is turned ON again.

The above discussion describes the operational sequence of the exposure meter of the second embodiment.

In the exposure meter of the above first and second embodiments, three mode measurements—ambient light measurement mode, cord-connected measurement mode and non-cord measurement mode—are possible and the apparatus automatically determines which mode is being used without the user manually setting the mode. However, it is not entirely necessary for the apparatus to automatically determine the mode as to all of said three modes because the present invention's method of determination is based on the following concepts:

(1) Whether ambient light measurement or cord-connected measurement is being performed is determined by performing two integration sessions in response to the commencement of light measurement and comparing the resulting photometric outputs (non-cord measurement is determined to exist by the detection of a light trigged.

(2) Where flash light emission is detected, whether cord-connected measurement or non-cord measurement is being performed is determined according to whether or not the flash light emission was detected within a prescribed period of time following the commencement of light measurement (if flash light emission is not detected, ambient light measurement is determined to exist).

For example, in an exposure meter having a first mode in which one of the above three measurement methods is used and a second mode in which the remaining two measurement methods are used, in which one of the two modes is manually selected, it is possible to automatically determine which of the two measurement methods of the second mode is being used. More specifically, in an exposure meter having two modes, i.e., an 'ambient light mode' and 'flash light mode (cord-connected/non-cord)', in which one of the modes is set manually by the user, it is possible to construct an exposure meter which automatically determines whether the cord-connected measurement method or the non-cord measurement method is being used if the 'flash light mode' is selected.

In this case, using the method of determination shown in FIGS. 5 and 6, when the ambient light mode is set, light measurement should take place according to a sequence in which steps (2) through (7), (10), (21), (22) and (31) of the steps shown in the flow chart of FIG. 5 are omitted. In other words, integration is performed for time tA in step (8) after measurement button 4 is turned ON and after the resulting integration output is converted through the A/D conversion circuit (9), photometric calculation and display are performed based on photometric output QA1' from this integration in step (11). Then in steps (12) through (15), light measurement is repeated while measurement button 4 is ON, and when measurement button 4 is turned OFF, the last value is maintained in step (32). On the other hand, when the flash light mode is set, light measurement should take place according to a sequence in which steps (8), (9), (11) and (13) through (15) of the steps shown in FIG. 5 are omitted. In this way, in the case of cord-connected measurement, after two photometric outputs are obtained in steps (1) through (7), 'YES' is returned in step (10) and photometric calculation and display are performed based on photometric output Q1' in step (22). In the case of non-cord measurement, 'NO' is given in step (10) and the apparatus goes into a standby state with CPU52 enabled to receive light trigger interrupt signals. (When this happens, display unit 14 shows nothing or a display that the apparatus is in a standby state). Then, as soon as flash light emission takes place in the non-cord measurement method, the routine jumps to step (41) of FIG. 6 and light measurement in the non-cord measurement mode is carried out.

Figure 7:
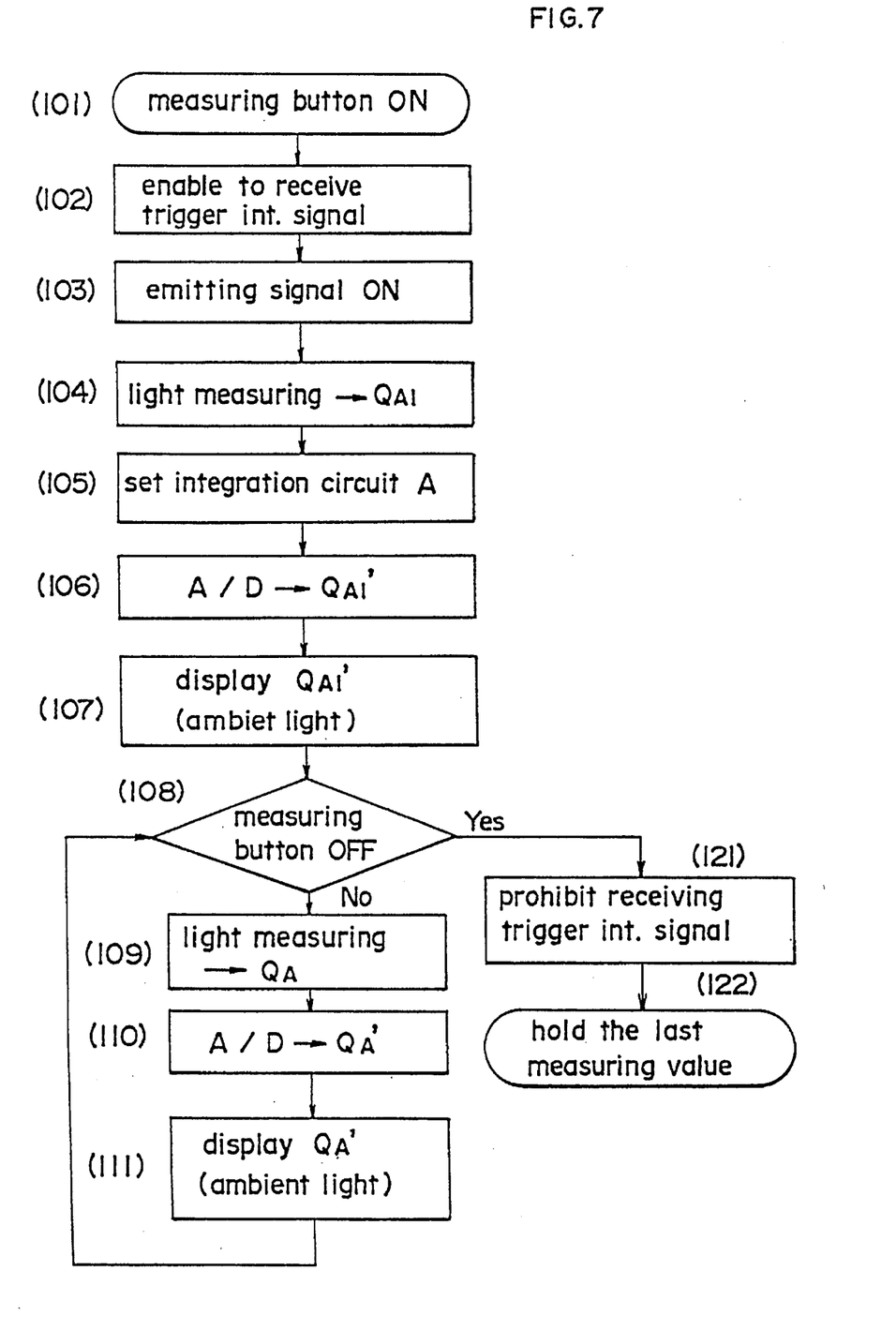
FIG. 7 is a flow chart showing the order of operation pertaining to the exposure meter in a second embodiment of the present invention.
Figure 8:
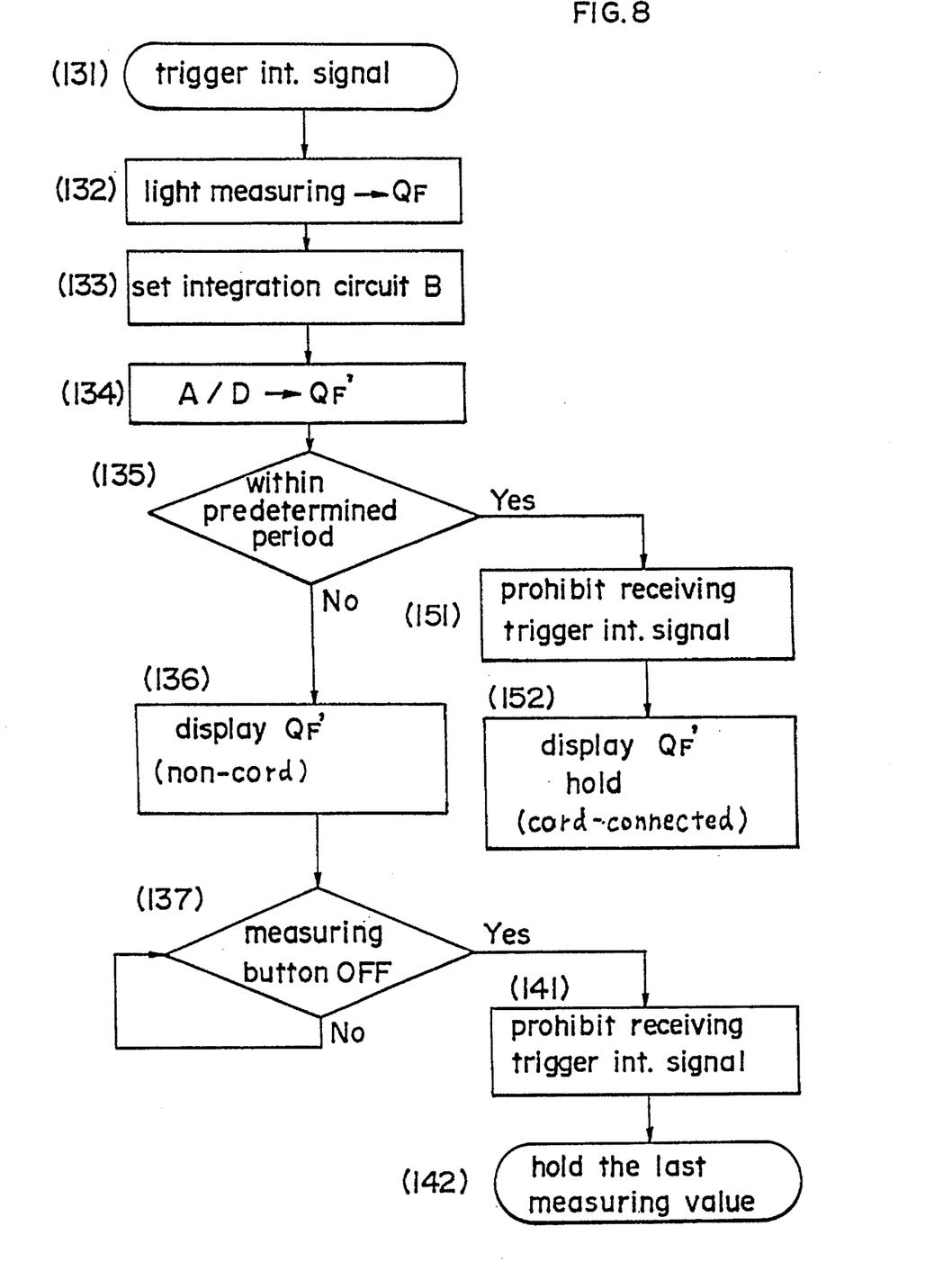
FIG. 8 is a flow chart showing the order of operation pertaining to the exposure meter in the second embodiment of the present invention.

On the other hand, in the method of determination shown in FIGS. 7 and 8, when the ambient light mode is set, light measurement should take place according to the sequence of steps (101) through (122) shown in the flow chart of FIG. 7. However, the operation regarding permission and prohibition to receive light trigger interrupt signals in steps (102) and (121), respectively, and the operation regarding output of a flash light emission signal in step (103) are omitted. On the other hand, when the flash light mode is set, the apparatus is placed in a standby state to wait for flash light emission from step (103) of FIG. 7 onward, and light measurement should take place as soon as flash light is emitted according to the sequence beginning with step (131) of FIG. 8.

Although the ambient light measurement method was deemed the first mode and the cord-connected and non-cord measurement methods the second mode in the above specific example, an exposure meter in which the cord-connected measurement method is deemed the first mode and the ambient light measurement and non-cord measurement methods the second mode or in which the non-cord measurement method is deemed the first mode and the ambient light measurement and cord-connected measurement methods the second mode may also be obtained simply by slightly changing the operation sequence. In addition, by omitting the operation when the ambient light mode is set in the specific example provided above, an exposure meter dedicated to flash light measurement in which cord-connected and non-cord measurement methods may be used can be obtained as well.

Light measurement using the sensitivity of instant film is explained in detail below. When photo-taking is performed, trial photo-taking is often used employing instant film prior to the main photo-taking session in order to confirm how the picture will turn out. However, the sensitivity of the instant film used for the trial photo-taking and the sensitivity of the film used for the main photo-taking are not necessarily the same. In general, the photo-taker usually sets the sensitivity of the film used for the main photo-taking on the exposure meter. Therefore, when performing the trial photo-taking using instant film, it is necessary to correct the exposure time or aperture value based on the sensitivity of the instant film. This correction is made via the photo-taker's mental calculation or by resetting the film sensitivity on the exposure meter. However, whether it is the photo-taker's mental calculation or resetting of the film sensitivity, it requires additional work on the part of the photo-taker, hindering the photo-taking session. Therefore, in order to eliminate this inconvenience, an exposure meter in which a prescribed film sensitivity (the sensitivity of the instant film where trial photo-taking is involved) is saved in a memory in advance, and in which the resetting of the film sensitivity may be performed via a one-touch operation by recalling the value saved in the memory has been proposed.

However, in said conventional exposure meter, after resetting the film sensitivity by recalling the value saved in the memory, another manual operation is needed in order to return the setting to the original film sensitivity. Therefore, manual operation to recall the sensitivity of the instant film needs to be performed when trial photo-taking is performed, and another manual operation to recall the original film sensitivity needs to be performed when main photo-taking takes place. Moreover, there are eases where the photo-taker forgets to recall the original film sensitivity when performing the main photo-taking and therefore light measurement takes place for the main photo-taking using the instant film's sensitivity, as a result of which the photo-taking fails due to inappropriate exposure.

The problem described above is resolved by using the exposure meter of an embodiment described below. The instant film's sensitivity set in advance and the calculation result for that film sensitivity are displayed in a simple one-touch operation, and moreover, after light measurement for the instant film is completed, the original film sensitivity used for the main photo-taking session and the calculation result as to that sensitivity are displayed.

Light measurement using the instant film's sensitivity is described in detail below with reference to the illustration of the apparatus shown in FIG. 1 and the content of the display shown in FIG. 2.

First, the film sensitivity used for the main photo-taking session (hereinafter 'Svs') and the instant film's sensitivity (hereinafter 'Svs") are set in advance. The setting of these film sensitivities is performed using the following operation. In the standard state (in which the power is ON but none of the switches have been operated), the sensitivity of the main photo-taking film is displayed with ISO mark 26 in sensitivity display area 24 of display unit 14. If up-down key 6 is operated in this state while ISO key 8 is pressed, the film sensitivity being displayed changes sequentially in response to the operation of up-down key 6. When ISO key 8 is released, the sensitivity shown at that time is set as the sensitivity of the main photo-taking film (Svs). The display in sensitivity display area 24 is then maintained showing the sensitivity thus set and ISO mark 26.

On the other hand, if instant key 10 is pressed in the standard state, INST.FILM mark 27 is lit with ISO mark 26 in sensitivity display area 24 and the display of film sensitivity is switched from that for the main photo-taking film to that for the instant film. If up-down key 6 is operated while instant key 10 is pressed in this state, the film sensitivity being displayed (instant film sensitivity) changes sequentially in response to the operation of up-down key 6. When instant key 10 is released, the film sensitivity at that time is set as the instant film sensitivity (Svs'). However, the display in sensitivity display area 24 returns to the display of the original main photo-taking film sensitivity when instant key 10 is released.

In the exposure meter of this embodiment, the sensitivity of the main photo-taking film (Svs) is displayed with ISO mark 26 in the standard state and while instant key 10 is pressed, the instant film's sensitivity (Svs') is displayed with INST.FILM mark 27 and ISO mark 26. When the pressing of instant key 10 is released, the display returns immediately to the original state.

Now two film sensitivities (Svs) and (Svs') as well as exposure time (Tvs) are deemed set. The intensity of the light measured by means of turning measurement button 4 ON in this state is deemed (Bv). All of said (Svs, Svs', Tvs, Bv) and (Av, Av') described below are Apex values and the calculation formulae (1) and (2) described below are based on the Apex system.

First, in the standard state, the Av corresponding to the sensitivity of the main photo-taking film (Svs) is calculated using the following formula.

$$Av = Svs + Bv - Tvs \quad (1)$$

An F-number corresponding to this Av is then displayed on aperture value display area 22 and analog display area 36. Meanwhile, film sensitivity display area 24 displays the main photo-taking film sensitivity (Svs) with ISO mark 26.

When instant key 10 is pressed in this state, the Av' corresponding to the instant film sensitivity (Svs') is calculated using the following formula.

$$Av' = Svs' + Bv - Tvs \quad (2)$$

An F-number corresponding to this Av' is then displayed in aperture value display area 22 and analog display area 36. Meanwhile, film sensitivity display area 24 displays the instant film sensitivity (Svs') with INST.FILM mark 27 and ISO mark 26. This display is shown only while instant key 10 is pressed and as soon as the pressing of key 10 is released, the routine returns to the original standard state.

As described above, in the exposure meter of this embodiment, the instant film sensitivity and its corresponding measurement value are displayed only while instant key 10 is pressed and when the pressing of instant key 10 is released, the display of the original main photo-taking film sensitivity and its corresponding measurement value are immediately returned to. Because of this, it is not necessary to reset the original film sensitivity when performing main photo-taking as in the case of the conventional exposure meter, and the failure in photo-taking arising due to the photo-taker forgetting to reset the original film sensitivity can also be prevented.

Said Svs' can be applied not only to the sensitivity of instant film but also to a case where two types of film having different sensitivities are used in photo-taking.

What is claimed is:

1. A light measuring apparatus capable of measuring ambient light and flash light, comprising:

a photoelectric sensor to convert the light to be measured into an electric signal;

a manual operating member which is manually operated by the user to start light measurement;

a generating device to generate a flash light emission signal in response to the operation of said manual operating member and to transmit said flash light emission signal to the flash unit where the flash unit is connected to the apparatus using a cord;

a detecting device to detect the emission of flash light by monitoring a sudden change in the intensity of the light being measured;

an integration circuit to perform integration of electric signals output by said photoelectric sensor;

a control device to regulate said integration circuit such that said integration circuit performs integration twice at prescribed intervals in response to the operation of said manual operating member;

a first mode in which light measurement is conducted without any flash light emission;

a second mode in which the flash unit is connected to the apparatus using a cord and light measurement begins at the same time as the transmission of said flash light emission signal to the flash unit through the cord;

a third mode in which the flash unit is not connected to the apparatus and light measurement begins in response to the detection of flash light emission by said detecting device;

a determining device to determine the mode in which light measurement took place based on an electric signal output by said photoelectric sensor; and a calculator to calculate measurement values for the mode used based on the output from said integration circuit wherein said determining device compares the two outputs generated from said two integrations by said integration circuit and determines that light measurement took place in the first mode when the two outputs generated by said two integrations are almost equal, and wherein said calculator calculates measurement values for the first mode based on either of said two outputs from said integration circuit.

2. A light measuring apparatus claimed in claim 1, wherein said determining device compares the two outputs generated from said two integrations by said integration circuit and determines that light measurement took place in the second mode when the output from the first integration is larger than the output from the second integration, and wherein said calculator calculates measurement values for the second mode based on the first output from said integration circuit.

3. A light measuring apparatus claimed in claim 1, further comprising:

a second integration circuit to perform integration of electric signals output by said photoelectric sensor; and a second control device to regulate said second integration circuit such that said second integration circuit performs integration in response to the detection of flash light emission by said detecting device, wherein said determining device determines that light measurement took place in the third mode when said detecting device detects the emission of flash light after the transmission of said flash slight emission signal is completed; and wherein said calculator calculates measurement values for the third mode based on the output from said second integration circuit.

4. A light measuring apparatus for measuring ambient light and flash light, comprising:

a manual operating member which is manually operated by the user to start light measurement;

a generating device to generate a flash light emission signal in response to the operation of said manual operating member and to transmit said flash light emission signal to a flash unit;

a light trigger detection circuit for detecting a flash light emission;

a photoelectric sensor for converting the light to be measured into a plurality of measurement electrical signals;

automatic processing means for processing the measurement electrical signals to determine, from a measured characteristic of the measurement electrical signals, a particular mode of light received by the photoelectric sensor, the particular mode being selected from ambient light when a first and a second measurement electrical signal are determined to be equal after a predetermined time period lapse between the measurements, a flash light generated from a light source hard wired to the generating device when a first and a second measurement electrical signal are determined to be unequal after a predetermined time period lapse between measurements, and a remote flash light not hard wired to the light measuring apparatus wherein the light trigger detection circuit detects a flash light emission; and a calculator means for calculating measurement values based on the mode of light determined by the processing memos.

5. A light measuring apparatus capable of measuring ambient light and flash light, comprising:

a photoelectric sensor to convert the light to be measured into an electric signal;

a manual operating member which is manually operated by the user to start light measurement:

a generating device to generate a flash light emission signal in response to the operation of said manual operating member and to transmit said flash light emission signal to the flash unit where the flash unit is connected to the apparatus using a cord:

a detecting device to detect the emission of flash light by monitoring a sudden change in the intensity of the light being measured;

an integration circuit to perform integration of electric signals output by said photoelectric sensor;

a control device to regulate said integration circuit such that said integration circuit performs integration twice at prescribed intervals in response to the operation of said manual operating member; and a determining device to determine a mode in which light measurement took place based on an electric signal output by said photoelectric sensor including:

a first mode in which light measurement is conducted without any flash light emission;

a second mode in which the flash unit is connected to the apparatus using a cord and light measurement begins simultaneously with the transmission of said flash light emission signal to the flash unit through the cord; and a third mode in which the flash unit is not connected to the apparatus and light measurement begins in response to the detection of flash light emission by said detecting device;

wherein said determining device determines whether the mode in which light measurement took place was the first mode or the second mode by comparing the two outputs generated from said two integrations by said integration circuit.

6. A light measuring apparatus claimed in claim 5, wherein said determining device determines that light measurement took place in the first mode when the two outputs generated by said two integrations are almost equal and that light measurement took place in the second mode when the output from the first integration is larger than the output from the second integration.

7. A light measuring apparatus claimed in claim 5, wherein said determining device determines that light measurement took place in the third mode when said detecting device detects the emission of flash light after the transmission of said flash light emission signal is completed.

* * * * *